(12) United States Patent
Guo

(10) Patent No.: US 7,753,227 B2
(45) Date of Patent: Jul. 13, 2010

(54) TORSION SPRING CONFIGURATION AND RELEASABLE CASING UTILIZING THE SAME

(75) Inventor: Shi-Kun Guo, Guangdong (CN)

(73) Assignees: Hong Fu Jin Precision Industry (Shen Zhen) Co., Ltd., Longhua Town, Bao'an District, Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 627 days.

(21) Appl. No.: 11/309,695

(22) Filed: Sep. 14, 2006

(65) Prior Publication Data

US 2008/0078776 A1 Apr. 3, 2008

(51) Int. Cl.
*B65D 43/16* (2006.01)

(52) U.S. Cl. .................. 220/830; 220/254.5
(58) Field of Classification Search .......... 220/254.5, 220/830
See application file for complete search history.

(56) References Cited

U.S. PATENT DOCUMENTS

| | | | | |
|---|---|---|---|---|
| 2,557,048 A | * | 6/1951 | Haase | 220/830 |
| 4,524,438 A | * | 6/1985 | Einhaus | 369/75.11 |
| 4,828,235 A | | 5/1989 | Paggeot | |
| 5,240,319 A | * | 8/1993 | Koga | 312/319.2 |
| 5,465,862 A | * | 11/1995 | Devlin | 220/830 |
| 5,509,529 A | * | 4/1996 | Kelley | 206/77.1 |
| 6,155,443 A | * | 12/2000 | Benedetti | 220/4.22 |
| 6,220,586 B1 | | 4/2001 | Pavlin et al. | |
| 6,626,287 B1 | * | 9/2003 | Watson | 206/6 |
| 2004/0011804 A1 | * | 1/2004 | Yanagihara | 220/830 |
| 2005/0139598 A1 | * | 6/2005 | Tack et al. | 220/259.1 |

FOREIGN PATENT DOCUMENTS

CN 2125643 12/1992

* cited by examiner

*Primary Examiner*—Anthony Stashick
*Assistant Examiner*—James N Smalley
(74) *Attorney, Agent, or Firm*—Winston Hsu

(57) ABSTRACT

A torsion spring includes a spring body wound by a helical wire, a first arm extending tangently from an end of the spring body, and a second arm extending from the other end of the spring body. The first arm includes sequentially a first portion extending from the spring body, a curved second portion bent toward a first direction from the first portion, and a curved third portion bent toward a different second direction from the second portion. A torsion spring assembly and a releasable casing using the torsion spring are also disclosed.

3 Claims, 6 Drawing Sheets

TORSION SPRING CONFIGURATION AND RELEASABLE CASING UTILIZING THE SAME

1. Field of the Invention

The present invention generally relates to spring configurations and, more particularly, to a torsion spring configuration and a releasable casing using the same.

2. Description of Related Art

A torsion spring is a mechanical element that reacts against torsion (twisting motion). A torsion spring is often made from a wire, ribbon, bar, or coil. Torsion Springs are widely used in automobiles, motorcycles, electrical appliances, telecommunication equipment, and other civil fields.

In operation, the more the torsion spring is twisted, the more force it needs to twist the torsion spring further. That is, the torsion spring is a kind of non-constant force provider.

Accordingly, to perform as a superior force provider, a need exists for a torsion spring configuration without the above disadvantages in the industry.

SUMMARY OF THE INVENTION

A releasable casing includes a base, a lid coupled to the base, a first torsion spring and a second torsion spring. The lid is rotatable around a rotating axis with respect to the base. The first torsion spring includes a first spring body, a first arm, and a second arm extending from the spring body. The first arm resists the lid toward an opening direction of the lid, and the second arm is fixed relative to the base. The first arm includes a first portion connected to the first spring body, an arc-shaped second portion extending from the first portion, and an arc-shaped third portion extending from the second portion. The first portion extends from the first spring body along a tangent direction thereof, and the second portion and the third portion bend oppositely. The second torsion spring includes a second spring body, and a third arm and a fourth arm extending from the second spring body. The third arm resists against the lid, and the fourth arm is fixed relative to the base.

A torsion spring assembly, which is used for opening a lid, includes a first spring and a second torsion spring. The first torsion spring includes a first spring body, a first spring arm configured for resisting against the lid, and a second spring arm configured for being fixed relative to the first spring body. The first and second spring arms extend from opposite ends of the first spring body. The first arm sequentially includes a first portion, a curved second portion, and a curved third portion. The third portion is deformable with respect to the first portion to apply a first force to prevent the lid from releasing. The second spring includes a second spring body, a third spring arm for resisting against the lid to apply a second force to release the lid, and a fourth spring arm for being fixed, the third and fourth spring arms extending from opposite ends of the second spring body.

A torsion spring includes a spring body wound by a helical wire, a first arm extending tangently from an end of the spring body, and a second arm extending from the other end of the spring body. The first arm includes sequentially a first portion extending from the spring body, a curved second portion bent toward a first direction from the first portion, and a curved third portion bent toward a different second direction from the second portion.

Other systems, methods, features, and advantages of the present torsion spring configuration and the present releasable casing with the torsion spring configuration will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF THE DRAWINGS

Many aspects of the present torsion spring configuration and the present releasable casing with the torsion spring configuration can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe in detail, the preferred embodiments of the present torsion spring configuration and the present releasable casing with the torsion spring configuration.

Torsion springs are helical springs used to apply torque or store rotational energy. Torque by definition is a force that produces rotation. A torsion spring exerts a force of torque in a circular arc, and arms of the torsion spring rotate about a central axis thereof.

A typical torsion spring includes a cylindrical body constructed with a helical wire, two ends of the helical wire form a pair of arms extending from the body. In use, the body is typically sleeved on a rod, either one of the pair of arms is fixed, while the other arm (a free arm) is movable relative to the rod.

When a force is acted on the free arm at a distance from an axis of the torsion spring, the torque (a.k.a. moment), which is equal to the force multiplied by the arm of force (i.e. a distance of a point of contact of the arm), causes the free arm to rotate around the axis, thus, kinetic energy is transformed to potential energy.

When the torsion spring releases/exerts the potential energy stored, the free arm of the torsion spring rotates and returns to an initial position. A force acted from the free arm of the torsion spring gradually decreases as the free arm moves closer to the initial position. Supposing that the above torsion spring is utilized to release a lid of a releasable casing, a force applied to the lid by the torsion spring would gradually decreases. This results in that the lid rotates unevenly together with the free arm of the torsion spring during the releasing process.

As described above, it is difficult to choose an appropriate torsion spring for a given releasable casing. This is because in the given releasable casing, if the torsion spring thereof carries a relatively great torque, the lid would open and strike the releasable casing fiercely, resulting in undesired ricochets, shakes, or vibrations. Thus, the lid, or the releasable casing would be prone to damage. On the other hand, if the torsion spring carries a relatively small torque, the lid cannot open at a greatest releasing angle.

Hereinafter, a torsion spring configuration is described in detail to solve the above problem satisfactorily.

Figure 1:
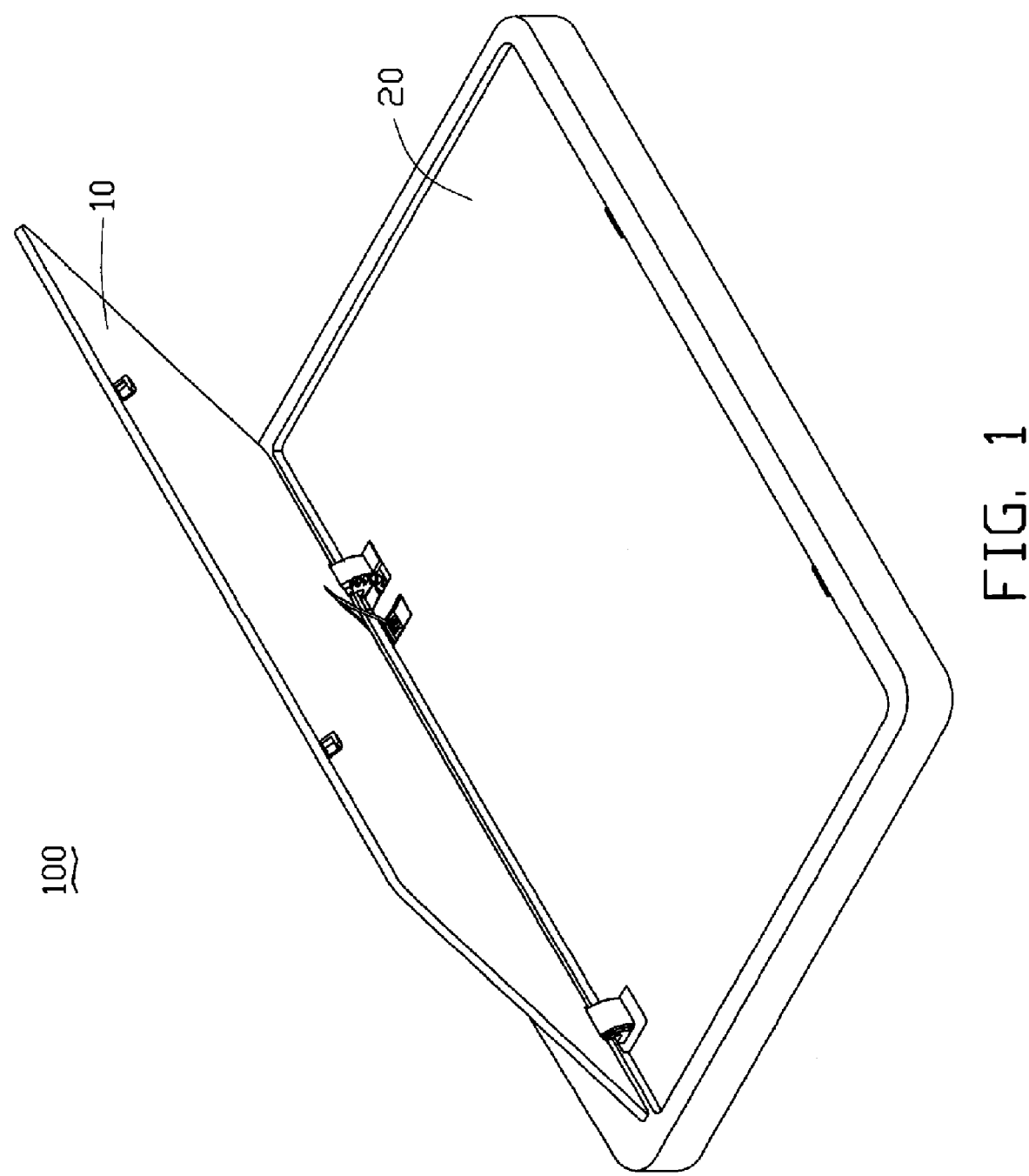
FIG. 1 is an isometric view of a releasable casing with a torsion spring configuration in accordance with an exemplary embodiment mounted thereto, the releasable casing including a lid, a base, a first torsion spring, and a second torsion spring.
Figure 2:
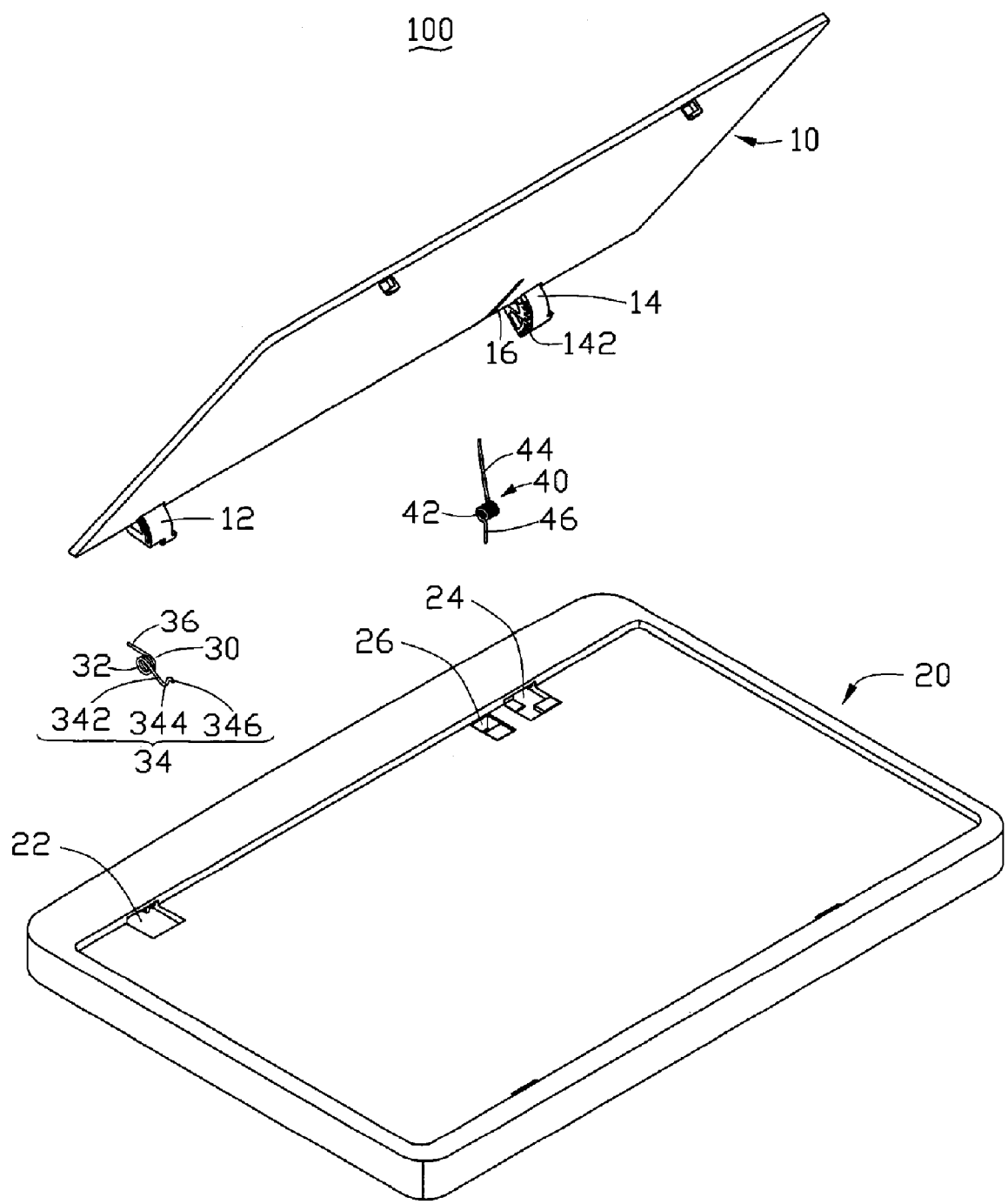
FIG. 2 is an exploded view of the releasable casing of FIG. 1.

Referring to FIG. 1 and FIG. 2, a releasable casing 100 with a lid 10 thereof released is illustrated. The releasable casing 100 includes a lid 10 and a base 20 pivotably attached together, further, a first torsion spring 30 and a second torsion spring 40 are used as force providers to provide a releasing force cooperatively, thus releasing the lid 10. The lid 10 is rotatable around a rotating axis OO with respect to the base 20, the position of the lid 10 with respect to the base 20 defines an opened state, a closed state, and a half opened state. The opened state is where the lid 10 is fully released from the base 20 at a largest opening angle, the closed state is where the lid 10 fully covers on the base 20, and the half opened state is an intermediate state between the opened state and the closed state. The first torsion spring 30 and the second torsion spring 40 are utilized to provide the torque force that actuates the lid 10.

The lid 10 includes a first supporting portion 12 and a second supporting portion 14, both of which are in quadrant shapes. The first and second supporting portions 12 and 14 are formed near an edge of the lid 10 with axes thereof superposing each other and the rotating axis OO of the lid 10. A positioning slot 16 perpendicular to the rotating axis OO of the lid 10 is defined beside the second supporting portion 14. The first supporting portion 12 and the positioning slot 16 are respectively used to position the first torsion spring 30 and the second torsion spring 40. The second supporting portion 14 forms a partial gear 142 to engage/mesh with a gear (not shown) positioned in the base 20 thus, slowing down the lid 10 during an opening procedure and dampening an impact between the lid 10 and the base 20 when reaching the largest opening angle.

The base 20 defines a first opening 22, a second opening 24, and a third opening 26. The first opening 22 is defined near an edge of the base 20 corresponding to the first supporting portion 12 of the lid 10 allowing the first supporting portion 12 to extend therethrough. Similarly, the second opening 24 is defined near the edge of the base 20 corresponding to the second supporting portion 14 of the lid 10 allowing the second supporting portion 14 to extend therethrough. The third opening 26 is defined near the second opening 24 to allow an arm of the second torsion spring 40 to extend therethrough reaching the positioning slot 16 of the lid 10.

The first torsion spring 30 includes a first body 32 spun in a coil, and a first arm 34 and a second arm 36 extending from the first body 32. The first arm 34 extends from an end of the first body 32 forming an S-shape, and the second arm 36 extends tangently from an opposite end of the first body 32. The second arm 36 is relatively a straight arm extending from the first body 32, and the first arm 34 includes a first portion 342 extending relatively straight along an opposite direction to the second arm 36, an arc-shaped second portion 344, and an arc-shaped third portion 346. The second portion 344 and the third portion 346 are end-to-end, and the bending directions thereof are opposite to each other. That is, a center point of an imaginary circle conformed to the second portion 344 and a center point of an imaginary circle conformed to the third portion 346 are respectively positioned at two opposite sides of the first arm 34.

The second torsion spring 40 includes a second body 42 converted in coils, and a third arm 44 and a fourth arm 46 extending from the second body 42. The third arm 44 and the fourth arm 46 are straight arms. The third arm 44 extends tangently from an end of the second body 42, and the fourth arm 46 extends radially from another opposite end of the second body 42.

The first body 32 and the second body 42 are sleeved on rods (not shown) formed in the base 20 correspondingly. The first arm 34 of the first torsion spring 30 and the third arm 44 of the second torsion spring 40 are fixed to the lid 10 of the releasable casing 100, while the second arm 36 of the first torsion spring 30 and the fourth arm 46 of the second torsion spring 40 are fixed to the base 20. Detailedly, the first arm 34 resists against the first supporting portion 12 of the lid 10, and the third arm 44 is restricted in the positioning slot 16 defined on the lid 10.

Figure 3:
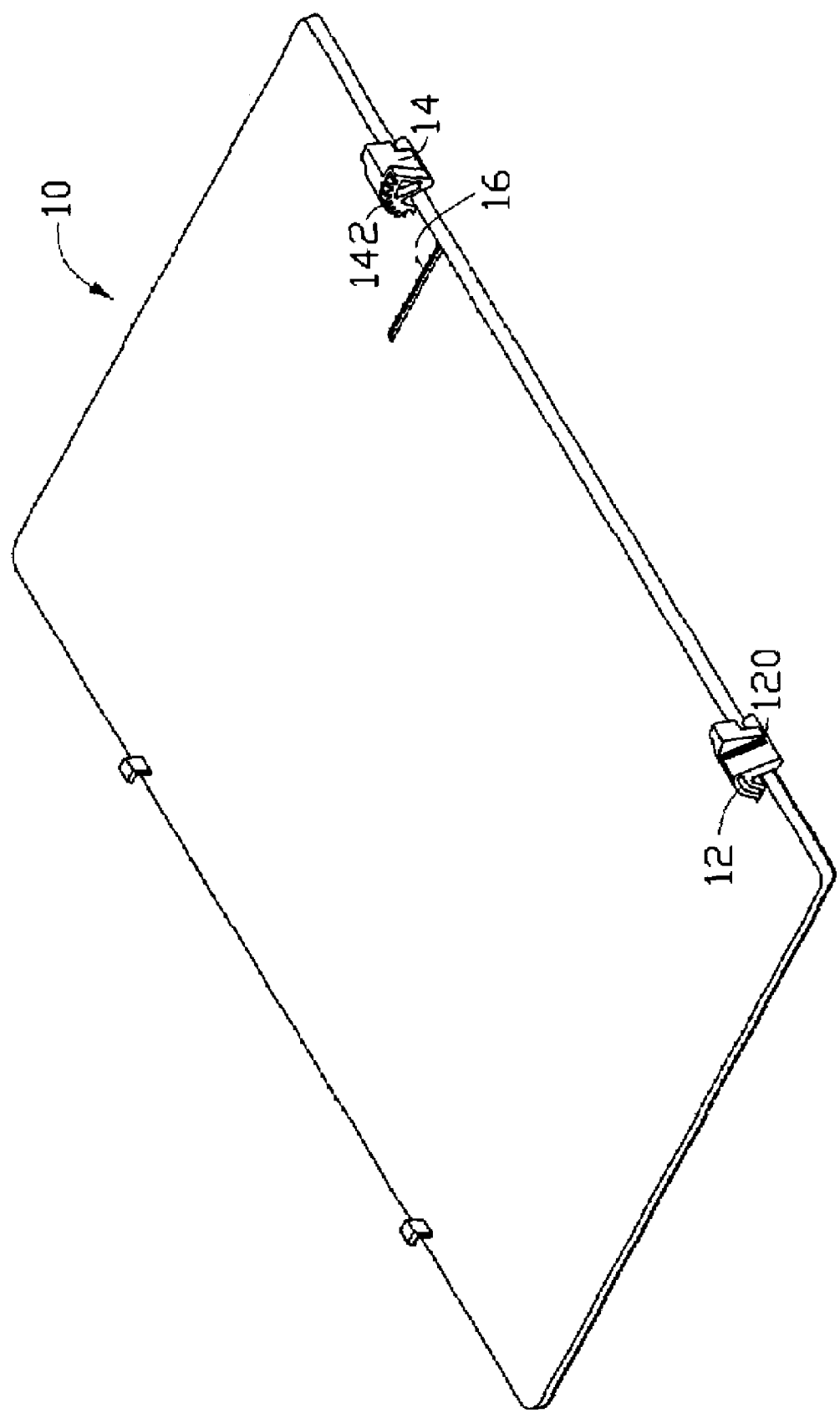
FIG. 3 is an isometric view of the lid of FIG. 1, but viewed from an inverted aspect.

Referring to FIG. 3 together, the first supporting portion 12 defines a sliding channel 120 at a bottom thereof to allow the first arm 34 to be restricted therein and slide therealong.

Figure 4:
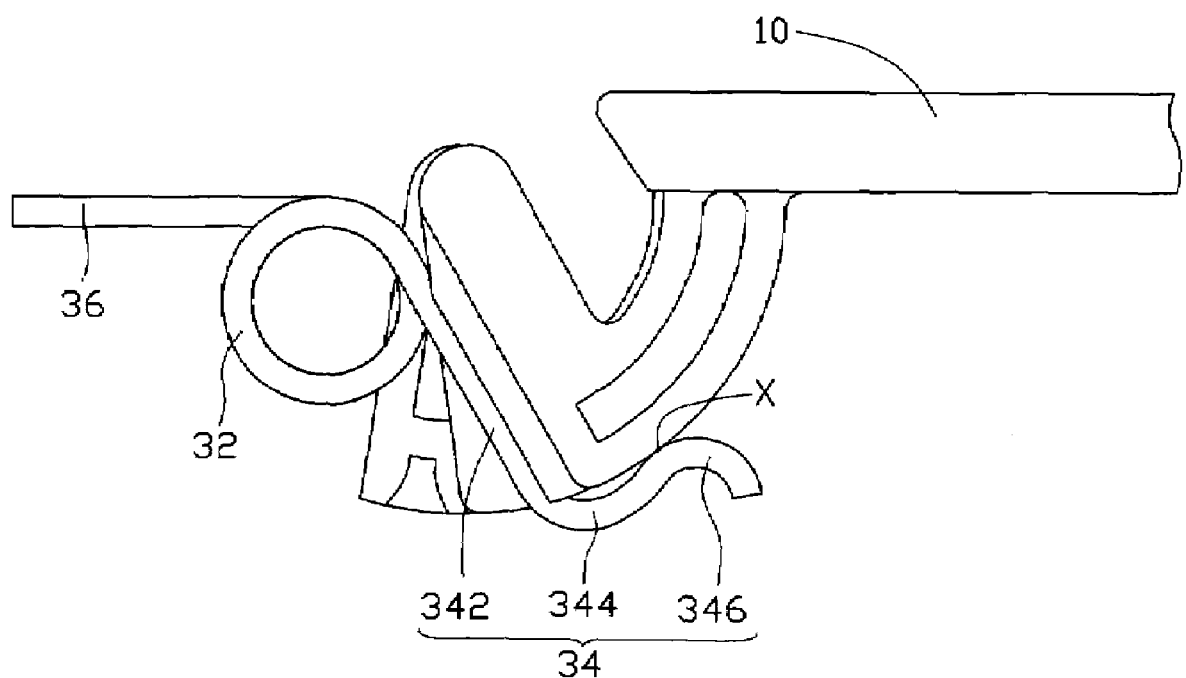
FIG. 4 is a schematic view showing a relationship of the first torsion spring and the lid in a closed state.
Figure 5:
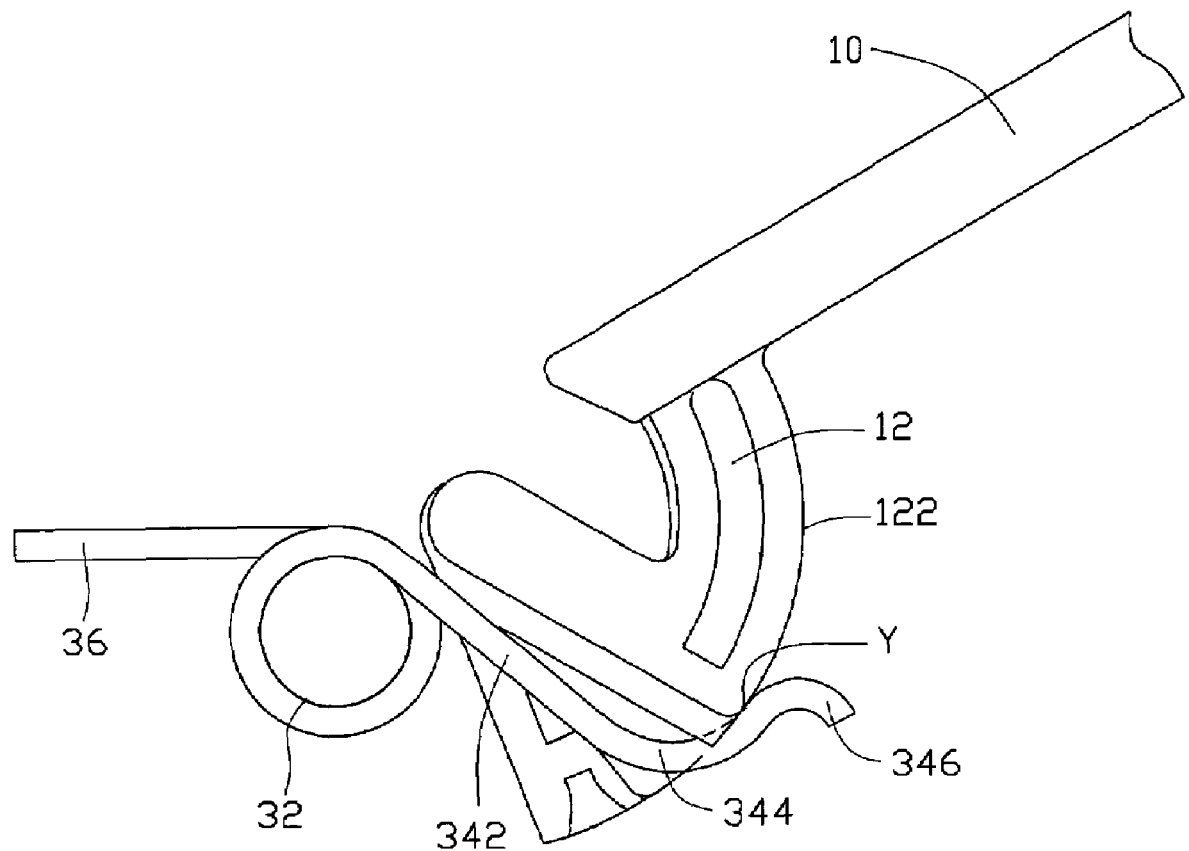
FIG. 5 is a schematic view showing a relationship of the first torsion spring and the lid in an intermediate state.
Figure 6:
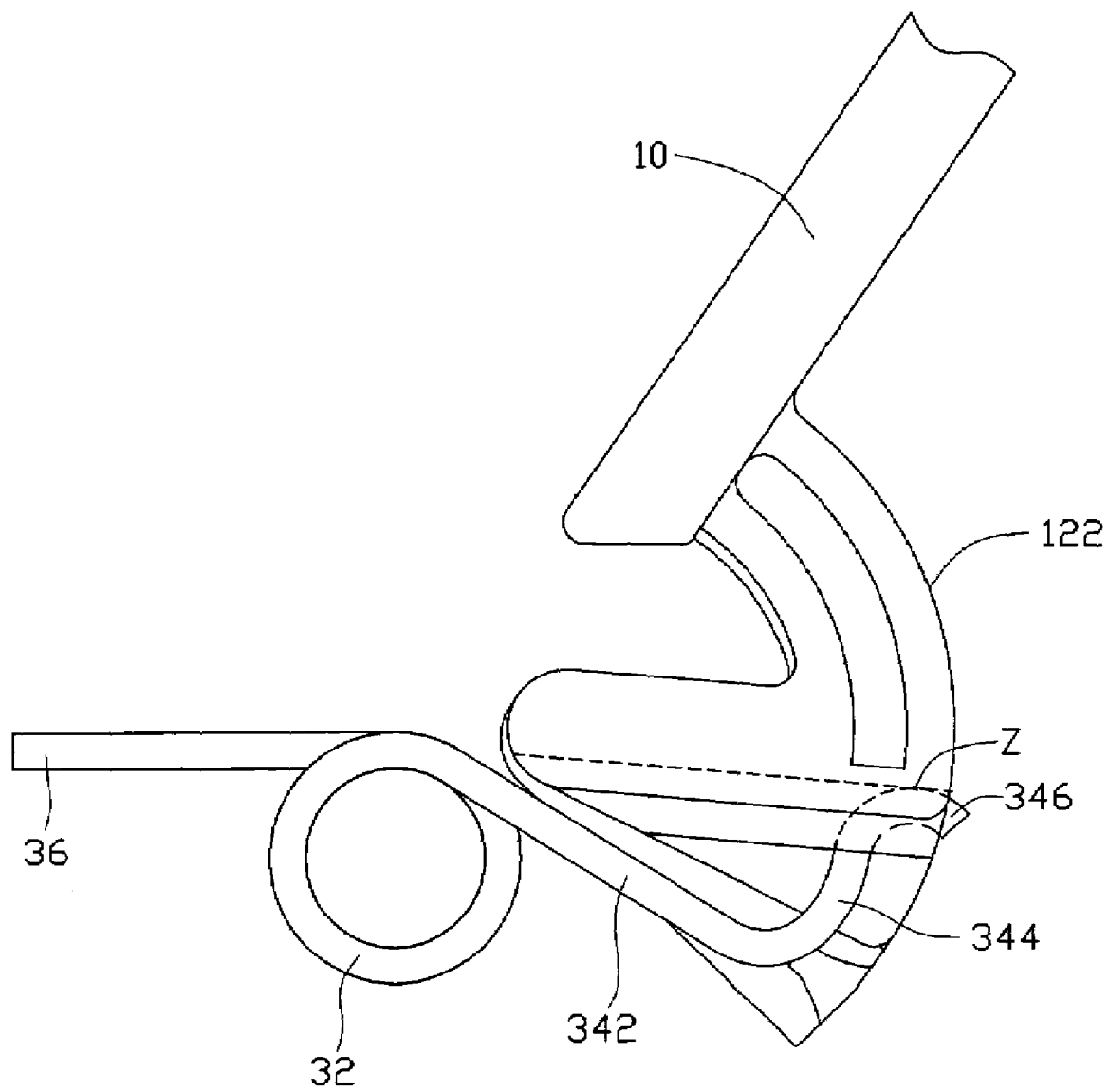
FIG. 6 is a schematic view showing a relationship of the first torsion spring and the lid in an opened state.

Different states during an opening procedure of the lid 10 are respectively shown in FIG. 4 to FIG. 6.

Firstly referring to FIG. 4, a schematic view showing a relationship between the first torsion spring 30 and the lid 10 in the closed state is illustrated. In such a situation, the lid 10 fully covers the base 20, and the first torsion spring 30 and the second torsion spring 40 are compressed. The first torsion spring 30 and the second torsion spring 40 carry great potential energy. The first portion 342 of the first torsion spring 30 is partially received in the sliding channel 120, and the second portion 344 and the third portion 346 resist against the cambered surface 122 of the first supporting portion 12. A contacting point X of the first arm 34 and the cambered surface 122 is on a conjunction of the second portion 344 and the third portion 346. As a relative position of the third portion 346 and the first portion 342 is changed due to the first supporting portion 12 therebetween, the third portion 346 of the first arm 34 applies a restoration force through the contacting point X onto the first supporting portion 12 along a radial direction of the first supporting portion 12. The restoration force holds the first supporting portion 12 onto the base 20.

Subsequently referring to FIG. 5, a schematic view showing a relationship between the first torsion spring 30 and the lid 10 in the half opened state is illustrated. As the lid 10 rotates relative to the rotating axis OO, a contacting point Y of the first arm 34 and the cambered surface 122 of the first supporting portion 12 gradually moves along the cambered surface 122. The restoration force applied by the third portion 346 of the first arm 34 holding the first supporting portion 12 of the lid gradually decreases.

Finally referring to FIG. 6, a schematic view showing a relationship between the first torsion spring 30 and the lid 10 in the opened state is illustrated. As the lid 10 rotates around the rotating axis OO to reach the largest opening angle, a contacting point Z of the first arm 34 of the first torsion spring 30 and the first supporting portion 12 gradually moves into the sliding channel 120. In such a situation, the third portion 346 of the first arm 34 applies a supporting force to the first supporting portion 12 to support the lid 10 at the largest opening angle.

As described above, from the closed state to the half opened state, the first torsion spring 30 applies a first force onto the first supporting portion 12 holding the first supporting portion 12 in the opening procedure. Meanwhile, the second torsion spring 40 applies a second force onto the lid 10 releasing the lid 10. During such a procedure, the first torsion spring 30 holds the lid 10, and the second torsion spring 40 releases the lid, thus, a resultant force of the first force and a second force applied to the lid 10 releasing the lid 10 is adjusted. As the opening angle increases, the first force applied by the first torsion spring 30 decreases, and the second force applied by the second torsion spring 40 decreases. Therefore, the resultant force of the first force and the second force changes slightly or remains constant. From the half opened state to the opened state, the third portion 346 of the first arm 34 moves into the sliding channel 120. The first force applied by the first torsion spring 30 disappears, and a third force is generated by the first arm 34 supporting the lid 10, helping the lid 10 to reach and remain at the largest opening angle. The second force applied by the second torsion spring 40 decreases continuously. When the third portion 346 moves into the sliding channel 120, the second force and the third force applied respectively by the first torsion spring 30 and the second torsion spring 40 together support the lid 10, and keep the lid 10 at the largest opening angle.

A closing procedure is a reverse procedure of the above opening procedure.

It is clear that the first torsion spring 30 cooperates with the second torsion spring 40 to maintain the releasing force of lid 10 during the releasing procedure, and to support the lid 10 at the largest opening angle so as to eliminate/depress shakes of the lid 10 in the opened state. Such a configuration of the first torsion spring 30 and the second torsion spring 40 effectively resolves common problems of conventional torsion springs. The releasable casing 100 is superior to those by having a substantially constant releasing force on the lid 10 and a long work life thereof due to depressed/eliminated strikes. This torsion spring configuration can be utilized in many electronic devices, such as a game player, a disc player, a tool box, or even a dressing case, etc.

It should be emphasized that the above-described embodiments of the present invention, including any preferred embodiments, are merely possible examples of implementation of the principles of the invention, and are merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and be protected by the following claims.

What is claimed is:

1. A releasable casing comprising:
   a base,
   a lid rotatably attached on the base,
   a torsion spring comprising a spring body fixed on the base, a first arm and a second arm connecting with two opposite ends of the spring body, the first arm resisting against the lid, the first arm comprising a first portion connected to the first spring body, an arc-shaped second portion extending from the first portion, and an arc-shaped third portion extending from the second portion, the second portion and the third portion bending oppositely, the second arm being fixed on the base, a contacting point between the first arm and the lid is changed between the second portion and the third portion when the lid rotates relative to the base;
   a quadrant shape supporting portion protrudes from the lid to resist against the second portion and the third portion;
   the supporting portion defines a sliding channel at a bottom thereof to allow the first arm to be restricted therein and slide therealong;
   the supporting portion comprises a cambered surface, the contacting point between the first arm and the lid is changed between the cambered surface and the sliding channel; and
   the third portion of the first arm is resistibly received in the sliding channel, when the lid is located at an open position, and a conjunction of the second portion and the third portion resists against the cambered surface of the supporting portion when the lid is located at a closed position.

2. The releasable casing as claimed in claim 1, wherein the second portion of the first arm resists against the cambered surface of the supporting portion when the lid is located at a half-open position.

3. A releasable casing, comprising:
   a base;
   a lid coupled to the base, the lid being rotatable around a rotating axis with respect to the base;
   a first torsion spring comprising a first spring body, and a first arm and a second arm extending from the spring body, the first arm resisting the lid toward an opening direction of the lid, the second arm being fixed relative to the base, the first arm comprising a first portion connected to the first spring body, an arc-shaped second portion extending from the first portion, and an arc-shaped third portion extending from the second portion, the first portion extending from the first spring body along a tangent direction thereof, the second portion and the third portion bending oppositely;
   a second torsion spring including a second spring body, and a third arm and a fourth arm extending from the second spring body, the third arm resisting on the lid, the fourth arm being fixed relative to the base; and
   a quadrant shape second portion protrudes from the lid, and the lid defines a sliding channel perpendicular to the rotating axis, the second portion and the third portion are substitutable resisting against the supporting portion and the sliding channel.

* * * * *